United States Patent [19]

Bailey

[11] 3,783,833
[45] Jan. 8, 1974

[54] AUTOMATIC EGG TURNER

[76] Inventor: Rex Edward Bailey, P.O. Box 264, Hahnville, La. 70057

[22] Filed: Mar. 12, 1971

[21] Appl. No.: 123,547

[52] U.S. Cl. .................................. 119/44, 119/37
[51] Int. Cl. .......................................... A01k 41/06
[58] Field of Search .................... 119/44, 37, 38; 99/242, 423; 318/466

[56] References Cited
UNITED STATES PATENTS

| | | | |
|---|---|---|---|
| 1,264,664 | 4/1918 | Light | 119/44 |
| 2,078,443 | 4/1937 | Clem | 119/44 X |
| 2,706,915 | 4/1955 | Rosenberg | 119/44 X |
| 677,006 | 6/1901 | Wescott | 119/44 |
| 2,637,835 | 5/1953 | Davidson | 318/466 X |
| 531,479 | 12/1894 | Stickney | 119/44 X |
| 2,697,395 | 12/1954 | Steriss | 99/423 |
| 2,486,030 | 10/1949 | James | 119/44 X |
| 2,793,581 | 5/1957 | Cannon | 119/44 X |

*Primary Examiner*—Louis G. Mancene
*Assistant Examiner*—James H. Czerwonky
*Attorney*—Schellin & Hoffman

[57] ABSTRACT

An automatic egg turner including an enclosure, a plurality of spaced rollers extending across the enclosure, an adjustable timer, a small electrical motor providing power to a gear reduction box, a power transmission train connected to the output gear of the gear reduction box, and normally opened switches in a control circuit periodically closed by camming means driven by the timer to energize the small motor and advance the rollers, thereby turning the eggs within the enclosure. The power transmission train employs a large input gear and a series of smaller driven gears and interspersed idler gears, so arranged that all of the rollers are advanced at the same time and in the same direction. The smaller driven gears and idler gears are held in constantly engaged and aligned position by a series of retainer links. The driven gears and idler gears are identical in shape. Consequently, when the control circuit is completed, the rollers are advanced so smoothly that layers of eggs can be stacked upon each other, with the lower layer serving as a roller for the eggs in each succeeding upper layers.

5 Claims, 6 Drawing Figures

INVENTOR
REX EDWARD BAILEY
BY *Schellin & Hoffman*
ATTORNEYS

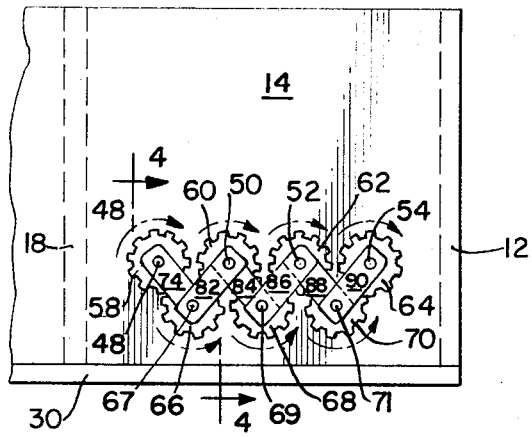
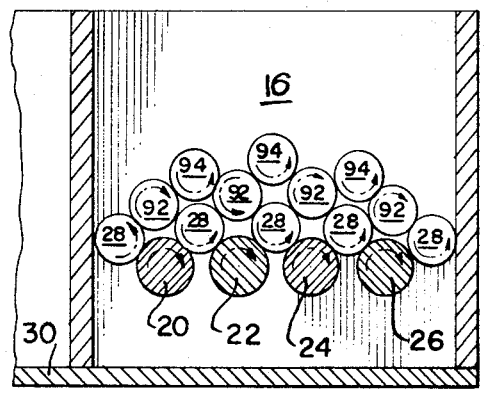
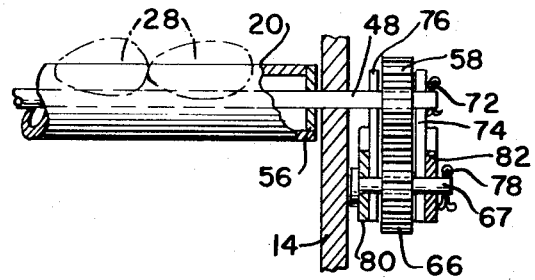
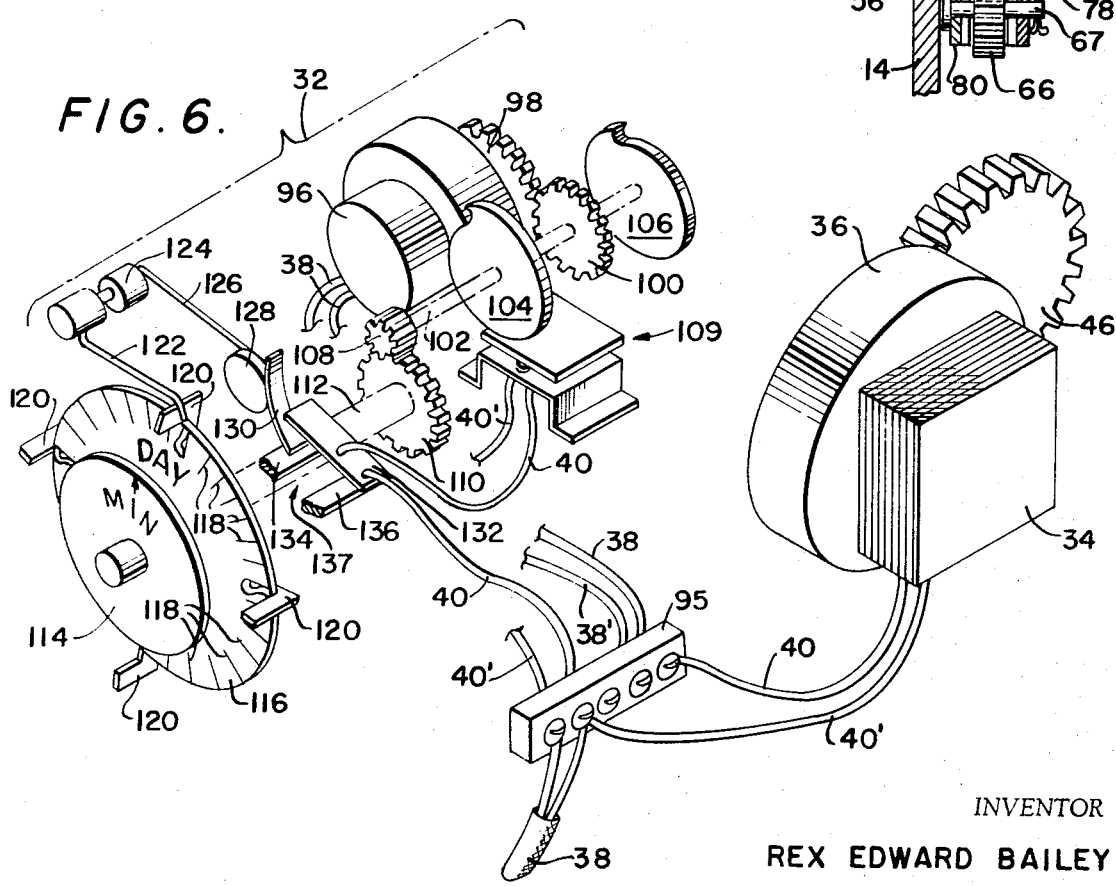
INVENTOR
REX EDWARD BAILEY 3,783,833

AUTOMATIC EGG TURNER

BACKGROUND OF THE INVENTION

1. Field of the Invention

The instant invention relates generally to egg turners, and more particularly to timer-controlled, periodically-operated automatic egg turners.

2. Description of the Prior Art

The need for efficiently and repeatedly turning eggs retained within an incubator has long been recognized. Such turning, which simulates the natural care given to eggs by setting hens, is necessary to insure a high yield of healthy chicks from each incubator.

Many of the early egg turners relied upon manually operated cranks to drive a gear train secured to the spaced rollers which supported a single layer of eggs thereupon. The rollers frequently had recesses or tapered surfaces formed thereon to more securely seat the eggs between the rollers, and thus rotate same. U. S. Pat. Nos. 1,643,102, Torrance, 1,682,321, Byrne, 2,022,723, Knapp, and 2,949,884, Luce, are representative of this variety of manually operated egg turners.

Other egg turners relied upon a frame with individual, cup-shaped egg holders instead of rollers. The frame was rocked and tilted by a complex mechanical linkage to impart a turning motion to the eggs seated in the individual holders. The mechanical linkage was actuated either manually or by a motor. U. S. Pat. Nos. 1,982,827, Olsen et al, and 2,782,759, Heise, are representative of this variety of egg turner.

Yet another variety of egg turner employs a plurality of egg trays that are tilted or oscillated by a reversible motor-driven worm gearing mechanism. The direction of the tilting movement of the trays is controlled by limit switches, which, when contacted, complete circuits that reverse the direction of motor rotation. U. S. Pat. Nos. 2,706,915, Rosenberg, exemplifies this variety of egg turner.

None of the egg turners noted above has met with wide-spread commerical acceptance by commerical hatcheries for various reasons. Many of the conventional devices, for example, require sizing of the eggs prior to insertion into the turning mechanism, lest the eggs be crushed between adjacent rollers or drop through the individual egg-holders. Additionally, many of the known devices have relied upon imparting only a tilting action to the eggs to be turned; this action fails to closely emulate the hen's natural actions of tilting and rolling the egg to completely develop the embryo prior to hatching from the egg. Furthermore, all of the known devices, even when they are motor-driven, are capable of turning or tilting one layer of eggs at a time, and thus waste a great deal of valuable space within the incubator.

SUMMARY

Thus, with the deficences of the prior art devices enumerated above in mind, the instant invention contemplates a positively driven egg turner that handles chicken, duck, turkey and goose eggs of all sizes with equal facility. Additionally, the instant invention is a compact, high-volume unit wherein the rollers supporting the lowermost layer of eggs turn so smoothly that each layer of eggs functions as a roller for the layer of eggs disposed thereabove. Furthermore, the frequency of the egg turning operation can be readily varied by manual adjustment of the timer operatively associated with the power transmission train that advances all of the rollers in the same direction. Additionally, within a preselected time period, the eggs are completely rotated about their horizontal axes, so that the eggs are uniformly exposed to the heat in the incubator.

Other objects, advantages and desirable features of the instant invention will become apparent in light of the following description of the invention when construed in connection with the accompanying sheets of drawings.

DESCRIPTION OF THE DRAWINGS

FIG. 3 is a fragmentary side elevational view of the enclosure showing the power transmission train on the exterior of the enclosure;

FIG. 4 is a fragmentary, detailed view of the power transmission, such view being taken along line 4—4 in FIG. 3 and in the direction indicated;

FIG. 5 is a fragmentary side elevational view of the interior of the enclosure showing the rollers with layers of eggs resting thereupon; and FIG. 6 is a combined exploded perspective of a timer having camming means and a stylized representation of a control circuit that is periodically completed by the camming means.

DESCRIPTION OF THE INVENTION

Figure 1:
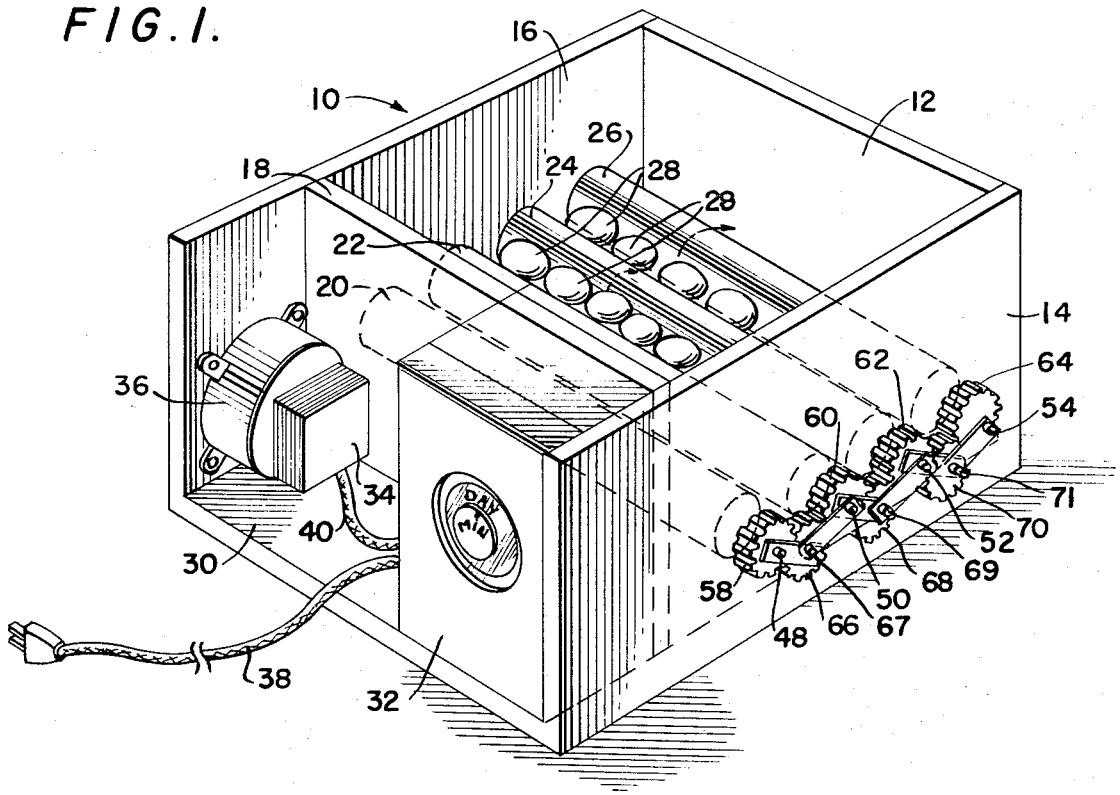
FIG. 1 is a perspective view of an automatic egg turner constructed in accordance with the principles of the instant invention, such view being taken toward the front right corner of the enclosure.

Referring now in greater detail to the drawings in which similar reference numerals refer to similar parts, FIG. 1 depicts an automatic egg turner indicated generally by reference numeral 10. Egg turner 10 includes an upwardly opening, rectangular enclosure that is defined by end wall 12, right side wall 14, left side wall 16, and forward wall 18. A plurality of hollow cylindrical rollers 20, 22, 24 and 26 extend horizontally across the enclosure. One or more layers of eggs 28 rest upon the rollers with their longer axis in a horizontal plane. Heat is supplied to the enclosure from a conventional heating source disposed thereabove within an incubator, and the rollers are spaced to insure, inter alia, adequate circulation of the heated air.

Figure 2:
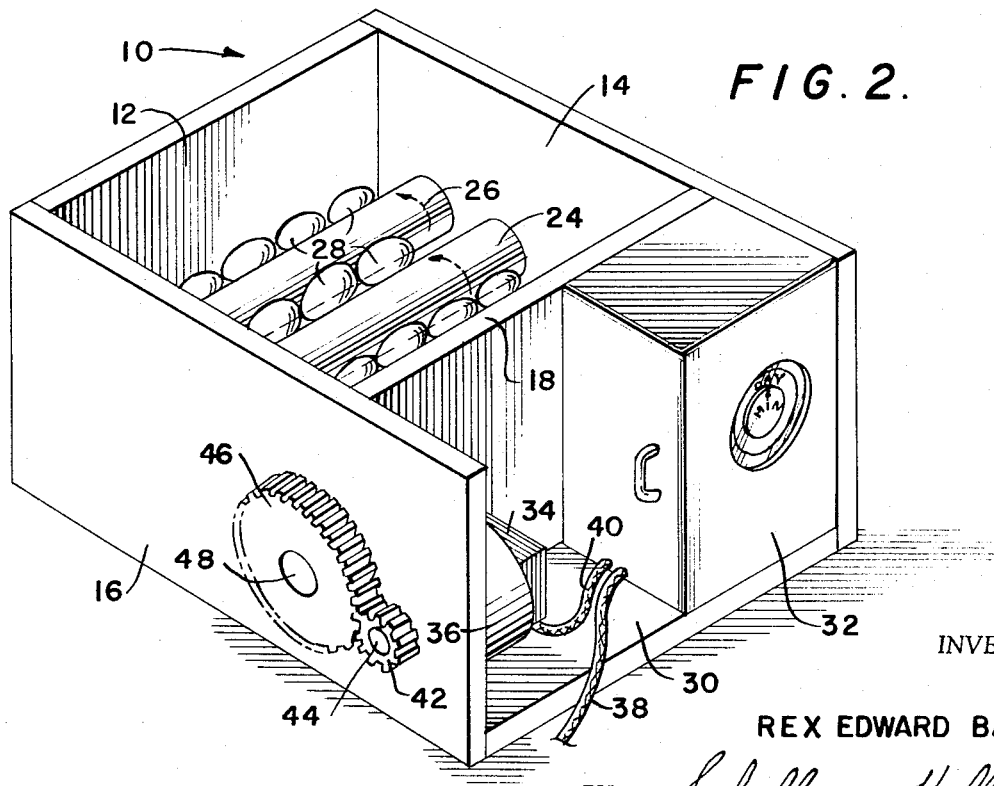
FIG. 2 is another perspective view of the egg turner, such view being taken toward the front left corner of the enclosure.

Turning now to FIG. 2, which complements the view shown in FIG. 1, it will be seen that the forwardly extending portions of side walls 14 and 16 cooperate with the forwardly extending portion of base 30 to define an L-shaped shelf. A manually adjustable timer 32, a small motor 34, and a gear reduction box 36 are firmly secured in place upon the shelf. All of these components are conventional, commerically available items; for example, a suitable timer is manufactured by the Zenith Electric Company of Chicago, Ill. Additional details of the timer construction may be found in U. S. Pat. Nos. 2,086,995 and 2,372,253. Power cord 38 delivers 60 cycle alternating-current to timer 32, and power cord 40 delivers direct current from the timer to motor 34.

The power transmission train for advancing rollers 20, 22, 24 and 26 extends from the exterior of left side wall 16 across the enclosure to the exterior of right side wall 14. A small spur gear 42 is secured to the output shaft 44 of gear reduction box 36, as shown in FIG. 2.

Gear 42 drives a much larger spur gear 46 which is secured to the left end of a shaft 48 which extends through hollow roller 20 and terminates at a point beyond right side wall 14. Gear 46 further step-downs the speed of rotation of roller 20 and imparts considerable rotative power thereto. Such power overcomes any tendency toward binding between adjacent eggs due to rough spots on the shells.

FIG. 3 illustrates that a shaft passes through the center of each hollow roller, for example, as previously noted, shaft 48 passes through roller 20. Shaft 50 passes through roller 22, and shaft 54 passes through roller 26. Each shaft extends through side walls 14 and 16 and is journalled in such side walls in a conventional manner for rotative motion. Each roller is secured to the shaft passing therethrough by a pair of end caps, one end cap situated at each end of the roller. Thus, as seen in FIG. 4, end cap 56 joins roller 20 to shaft 48 so that the shaft and roller move in concert.

A driven gear 58 is joined to shaft 48 exteriorly of side wall 14 to transmit to the remainder of the power transmission train the power imparted to the shaft from input gear 46. In a similar fashion, driven gear 60 is joined to shaft 50 to drive roller 22, driven gear 62 is joined to shaft 52 to drive roller 24, and driven gear 64 is joined to shaft 54 to drive roller 26. All of the driven gears, and thus all of the rollers, rotate in the same direction by virtue of idler gears 66, 68 and 70 mounted on stub shafts 67, 69 and 71, respectively. Each idler gear is disposed between a pair of spaced driven gears.

FIG. 3 discloses additional details of the power transmission train and the manner in which the driven gears are engaged with the idler gears so that all of the rollers are efficiently advanced in the same direction. Taking shaft 48 and driven gear 58 as being exemplary, driven gear 58 is held in fixed position on the right end of shaft 48 by cotter pin 72 and spaced retainer links 74 and 76. Driven gear 58 is constantly engaged with idler gear 66, and the idler gear is held in aligned position on stub shaft 67 by cotter pin 78 and spaced retainer links 80 and 82. Similar retainer links, such as 84, 86, 88 and 90 maintain constant engagement and alignment between the other gears in the power transmission train. Thus, it will be noted that the power transmission train is constantly in engagement and in alignment, and that the driven gears and idler gears are identical in nature. Phrased in another manner, the driven gears and the idler gears possess the same diameter, the same number of teeth, and the same pitch per tooth. Accordingly, the power transmission train efficiently advances the rollers in the same direction at the same time in a smooth manner unobtainable with prior art devices.

FIG. 5 is similar to FIG. 3, but the view is taken in a vertical plane just inside right side wall 14. The directional arrows associated with rollers 20, 22, 24 and 26 indicate that the rollers all turn in a clockwise fashion when power is supplied to the input gear 46 secured to shaft 48 of the power transmission train. The first layer of eggs 28 resting upon the rollers is thus turned in a counterclockwise fashion, as indicated by appropriate directional arrows. Due to the smoothness of the rotation of the rollers, and the magnitude of the rotative power supplied thereto, the first layer of eggs 28 serves as a roller for a second layer of eggs 92. The second layer of eggs 92 rotates in a clockwise direction and, in turn, serves as a roller for a third layer of eggs 94. The capability of piling many layers of eggs upon each other without breakage is a unique characteristic of the instant invention, which has significant financial ramifications for commerical hatcheries.

FIG. 6 is a view illustrating an exploded perspective view of vital portions of timer 32, motor 34, gear reduction box 36 and input gear 46 of the power transmission train and the manner of interconnecting and controlling such subassemblies. The power to drive timer 32 is supplied via lead 38 to bus bar 95.

Timer 32, which converts the alternating current into direct current by conventional current rectification techniques, includes a timer motor 96 which drives an output gear 98 which rotates a meshing spur gear 100 mounted upon shaft 102. A pair of cams 104, 106 are mounted on shaft 102 on opposite sides of gear 100, and a small spur gear 108 is mounted at the forward end of the shaft. A normally opened switch 109 is disposed in proximity to the cams so that the cams momentarily close the switch during each cycle of rotation. Gear 108 rotates a larger spur gear 110 secured to the rear end of shaft 112. A first dial 114, which is divided into sixty, one-minute increments, is secured to the forward end of shaft 112, and a second dial 116, which is divided into 24, one-hour increments, is also joined thereto. Each one-hour increment on dial 116 is further divided into four, fifteen-minute intervals. Each rotation of dial 114 advances dial 116 by one increment through conventional transfer gearing (not shown).

A series of spaced slots 118 adjacent to the periphery of dial 116 represents each 15-minute interval. Resilient metal clips 120 are slipped into the selected slots 118 to select those times during the day and night when one wishes the egg turner to be energized and the eggs advanced to a new position to be exposed to the heat of the incubator. Four clips 120 are visible in FIG. 6, for such clips extend radially beyond the periphery of dial 116.

Spring arm 122, which is mounted for pivotal movement within bracket 124, is disposed adjacent to dial 116. A contact blade 126 with a contact button 128 is secured to arm 122 and moves in concert therewith. Button 128 bears against movable switch blade 130, which is normally spaced from stationary switch blade 132. Blade 130 is held in position by support 134, while blade 132 is held in position by support 136. Switch 137 so formed is normally opened and is connected in series with normally opened switch 109; the two switches must be closed at the same time to complete the control circuit and deliver electrical power to motor 34.

The interrelated normally opened control circuit and the camming means for closing same, function in the following manner. Alternating current is supplied over leads 38, 38' to bus bar 95 of timer 32, and from there via a lead to the high side of motor unit 96 situated within the timer casing. Motor unit 96 transforms the alternating current to direct current, in a conventional manner, and causes output gear 98 to rotate, thereby rotating gear 100 secured to shaft 102 in the opposite direction. As shaft 102 is turned, cams 104, 106 bear lightly against the pressure plate of the first normally opened switch 109. The diameter of the cam lobes increases until the switch is closed by forcing the contact on the pressure plate into engagement with the contact on the stationary pressure plate, thus closing the first normally opened switch. The angular relationship of the cam lobes to one other can be easily adjusted to vary the duration of switch closure, as well as the moment of switch closure during the cycle of revolution. The switch closure occurs once during each revolution of the dial 114, or once every hour.

Motor 96 runs constantly and rotates dial 114, which, in turn, advances dial 116. As dial 116 rotates in a clockwise direction, clips 120 periodically lift spring arm 122 and pivot same in a counterclockwise direction. Contact blade 126 is simultaneously moved and shifts switch blade 130 into engagement with stationary switch blade 132, thus closing the second normally opened switch 137. In the preferred embodiment, while the first normally opened switch will be closed once during every hour, the second normally opened switch will be closed once every six hours, in accordance with the location and spacing of clips 120 on 24 hour dial 116. Since the two switches are wired in series, the circuit will be completed and power supplied to motor 34 only when both switches are closed simultaneously. The closure of switch 109 once every hour cannot energize motor 34. Motor 34, when energized, supplies motive power to the input side of gear reduction box 36, which, in turn, steps down the high speed of rotation fed thereto and produces a lower speed, higher power output at gear 44. Gear 44, in turn, drives spur gear 46 which supplies power to the above described, constantly engaged power transmission train. Consequently, rollers 20, 22, 24 and 26 are slowly advanced through a fraction of a revolution before the circuit supplying power to motor 34 is opened once again. For example, motor 34 may be energized once every six hours for a preselected interval by the simultaneous closure of switches 109 and 137 so that the rollers are advanced 90° at each energization. Thus, the layers of eggs would be completely turned about their horizontal axis once a day.

The foregoing is a description of a preferred embodiment of the invention which is exemplary in nature. Manifestly, the invention is not limited in scope to the specific configuration detailed above, but includes all such variations as fall within the spirit and scope of the inventive concepts embraced by the instant invention.

What is claimed is:

1. An automatic egg turner comprising:
   a. a plurality of spaced side walls and end walls defining an enclosure of sufficient depth to hold several layers of eggs therein,
   b. a plurality of spaced parallel cylindrical rollers extending across the lower end of said enclosure, said rollers being spaced equidistant from one another, the distance between said rollers being less than the diameter of an egg,
   c. a plurality of elongated shafts, one shaft extending through each of said rollers and said side walls to terminate exteriorly of said side walls,
   d. said rollers being secured to said shafts to rotate in concert therewith,
   e. a constantly engaged, periodically operated power transmission train mounted on said enclosure, interconnecting said rollers, for driving said rollers with a rotary motion,
   f. gear reduction means connected to said enclosure for supplying power to said transmission train,
   g. an electrical driving motor mounted on said enclosure for supplying power to said gear reduction means,
   h. timer means mounted on said enclosure and including a timer motor and camming means driven by said timer motor,
   i. a normally disabled control circuit connecting said timer means to said driving motor for energizing said motor,
   j. said camming means periodically enabling said control circuit to energize said driving motor,
   k. said power transmission train comprising:
      1. a plurality of driven gears, one gear being secured to the end of each elongated shaft,
      2. a plurality of stub shafts located in operative relationship to said driven gears, and
      3. a plurality of idler gears interconnecting said driven gears so that all of said rollers are advanced in the same direction.

2. An automatic egg turner as defined in claim 1 wherein a plurality of retainer links hold said driven gears and said idler gears in constant engagement.

3. An automatic egg turner as defined in claim 1 wherein each one of said driven gears and said idler gears is a spur gear having an identical configuration.

4. An automatic egg turner comprising:
   a. a plurality of spaced side walls and end walls defining an enclosure,
   b. a plurality of spaced parallel cylindrical rollers extending across said enclosure, the distance between said rollers being less than the diameter of an egg,
   c. a plurality of elongated shafts, one shaft extending through each of said rollers and said side walls to terminate at the exterior of said side walls,
   d. said rollers being secured to said shafts to rotate in concert therewith,
   e. a power transmission train mounted on said enclosure and interconnecting said rollers for rotating said rollers,
   f. gear reduction means connected to said enclosure for supplying power to said transmission train,
   g. an electrical driving motor mounted on said enclosure for supplying power to said gear reduction means,
   h. timer means mounted on said enclosure and including a timer motor and camming means driven by said timer motor,
   i. a normally disabled control circuit connecting said timer means to said driving motor for energizing said motor,
   j. said control circuit including a pair of switches connected in series,
   k. said camming means including a pair of spaced cam lobes,
   l. one of said switches of said control circuit being disposed in proximity to said cam lobes, and
   m. said camming means momentarily actuating said switch to periodically enable said control circuit to energize said driving motor.

5. An automatic egg turner as defined in claim 4 wherein the cam lobes are mounted upon a shaft so that they can be rotated relative to each other to vary the duration and moment of closure of the normally opened switch disposed in proximity to said cam lobes.

* * * * *